US006067214A

United States Patent [19]
Thomas, III

[11] Patent Number: 6,067,214
[45] Date of Patent: May 23, 2000

[54] DATA CARTRIDGE MARKER FOR FOREIGN OBJECT DETECTION

[75] Inventor: Fred C. Thomas, III, Ogden, Utah

[73] Assignee: Iomega Corporation, Roy, Utah

[21] Appl. No.: 09/058,833

[22] Filed: Apr. 13, 1998

Related U.S. Application Data

[63] Continuation-in-part of application No. 08/931,272, Sep. 15, 1997, and a continuation-in-part of application No. 08/833, 032, Apr. 3, 1997, Pat. No. 5,986,838, which is a continuation-in-part of application No. 08/388,242, Feb. 14, 1995, Pat. No. 5,638,228.

[51] Int. Cl.[7] .................................................. G11B 23/03
[52] U.S. Cl. ............................................. 360/133; 369/291
[58] Field of Search ........................... 360/60, 132, 133; 369/291

[56] References Cited

U.S. PATENT DOCUMENTS

| | | | |
|---|---|---|---|
| 3,718,078 | 2/1973 | Plummer | 359/742 |
| 3,727,045 | 4/1973 | Warren et al. | 246/169 A |
| 3,995,376 | 12/1976 | Kimble et al. | 35/25 |
| 4,080,899 | 3/1978 | Luban | 102/42 R |
| 4,102,059 | 7/1978 | Kimble et al. | 35/25 |
| 4,244,683 | 1/1981 | Rowland | 425/143 |
| 4,332,847 | 6/1982 | Rowland | 428/156 |
| 4,498,882 | 2/1985 | Evert | 441/116 |
| 4,571,645 | 2/1986 | Johnson et al. | 360/99.03 |

(List continued on next page.)

FOREIGN PATENT DOCUMENTS

| | | |
|---|---|---|
| 0 230 752 | 12/1986 | European Pat. Off. . |
| 0 210 629 | 2/1987 | European Pat. Off. . |
| 0 565 281 | 10/1993 | European Pat. Off. . |
| 21 35 059 | 1/1973 | Germany . |
| 33 39 655 | 3/1984 | Germany . |
| 3344209 | 6/1984 | Germany ................ 360/133 |
| 58-097167 | 6/1983 | Japan . |
| 161650 | 2/1992 | Japan . |
| 167286 | 6/1992 | Japan . |
| 168540 | 6/1994 | Japan . |
| WO 96/25737 | 8/1996 | WIPO . |
| WO 97/19449 | 5/1997 | WIPO . |

OTHER PUBLICATIONS

Patent Abstracts of Japan, vol. 18(85), published Feb. 1994, Appl'n No. 4–113,999, Sugarawa.

Jacobs, S.F., "Experiments with retrodirective arrays", *Optical Engineering*, 1982, 21(2), 281–283.

Rennilson, J. "Retroreflection–What is it and how is it used?", *ASTM Standardization News*, Feb. 1982.

Venable, W.H. et al., "Factor affecting the metrologyof retroreflective materials", *Applied Optics*, 1980, 19(8).

Walker, J. "The Amateur Scientist: Wonders with the retroreflector, a mirror that removes distortion from a light beam", *Scientific American*, 1988, 258(1), 96–99.

Reflexite Corporation Brochure NA1010, "Refectors for Photoelectric Controls", Apr. 1993, 4 pages.

Leaner, J.S., Shie, R., Petersen, J., "Holographic Light Shaping Diffuses", presented at The Aerospace Lighting Instittue, Advanced Seminar, Feb. 1994, Los Angeles, CA, 4 pages.

(List continued on next page.)

*Primary Examiner*—David L. Ometz
*Attorney, Agent, or Firm*—Woodcock Washburn Kurtz MacKiewicz & Norris LLP

[57] ABSTRACT

A disk cartridge has various structures for clearly delineating the cartridge from foreign objects which may cause damage to a disk drive. In one embodiment, one or more serial reflectors are embedded within a cartridge so as to return a reflected illuminance pattern distinguishable from a flat specular or flat diffuse surface. In another embodiment, optical pipes carry light from a disk drive mounted emitter to a location where the light is detected by the drive such that the light is not mistaken for reflective light. In another embodiment, a light emitting source such as an LED is embedded in a cartridge such that the intensity of light emitted from the LED in cooperation with reflected light is sufficiently intense to identify the cartridge as a valid cartridge. These embodiments may be rotatable so that a single cartridge may be compatible with more than one drive type.

9 Claims, 14 Drawing Sheets

U.S. PATENT DOCUMENTS

| | | | |
|---|---|---|---|
| 4,578,042 | 3/1986 | Evert | 441/117 |
| 4,592,554 | 6/1986 | Gilbertson et al. | 273/312 |
| 4,607,978 | 8/1986 | Eigenmann | 404/73 |
| 4,633,451 | 12/1986 | Ahn et al. | 369/14 |
| 4,649,264 | 3/1987 | Carson | 235/54 |
| 4,652,172 | 3/1987 | Eigenmann | 404/73 |
| 4,683,824 | 8/1987 | Gibbs | 102/436 |
| 4,762,292 | 8/1988 | D'Anci | 242/184 |
| 4,783,672 | 11/1988 | Wirtz et al. | 354/21 |
| 5,029,034 | 7/1991 | Weiley | 360/132 |
| 5,038,359 | 8/1991 | Pepper | 359/529 |
| 5,056,073 | 10/1991 | Fitzgerald et al. | 360/92 |
| 5,069,577 | 12/1991 | Murphy | 404/11 |
| 5,084,883 | 1/1992 | Khalid et al. | 372/24 |
| 5,123,000 | 6/1992 | Fitzgerald et al. | 360/92 |
| 5,159,182 | 10/1992 | Eisele | 360/133 |
| 5,159,560 | 10/1992 | Newell et al. | 364/479 |
| 5,206,869 | 4/1993 | Khalid et al. | 372/24 |
| 5,210,671 | 5/1993 | Blackston | 360/133 |
| 5,255,251 | 10/1993 | Fitzgerald et al. | 360/98.06 |
| 5,325,243 | 6/1994 | Rath et al. | 360/71 |
| 5,471,561 | 11/1995 | Cowgill et al. | 360/92 |
| 5,491,586 | 2/1996 | Phillips | 359/529 |
| 5,638,228 | 6/1997 | Thomas, III | 360/60 |
| 5,650,891 | 7/1997 | Thayne et al. | 360/99.06 |
| 5,721,655 | 2/1998 | Thweatt | 360/132 |
| 5,748,419 | 5/1998 | Langseth et al. | 360/133 |

OTHER PUBLICATIONS

Physical Optics Corporation Brochure JL1–493, "Light Shaping Diffusers", 2 pages.

The Optometrics Group Catalog, "Optical Components & Instruments Catalog—Gratings", 1996, 28–35.

Kathman, A. et al., "Binary Optics: New Diffractive Elements for the Designer's Tool Kit", The Photonics Design & Applications Handbook®, Laurin Publishing Co., Inc., 1994 (Book 3), H358–H360.

Loewen, E.G., "Diffraction Gratings: Selection of Size and Type for Different Applications", The Photonics Design & Applications Handbook®, Laurin Publishing Co., Inc., 1994 (Book 3), H362–H365.

Faklis, D. et al., "Optical Design/Diffractive Lenses: Taking Advantage of Diffractive Optics to Reduce Size, Weight and Cost", The Photonics Design & Applications Handbook®, Laurin Publishing Co., Inc., 1994 (Book 3), H386–H390.

Patent Abstracts of Japan, vol. 008(163), Jul. 27, 1984, of Publication No. JP 59 058630 A, published Apr. 4, 1984.

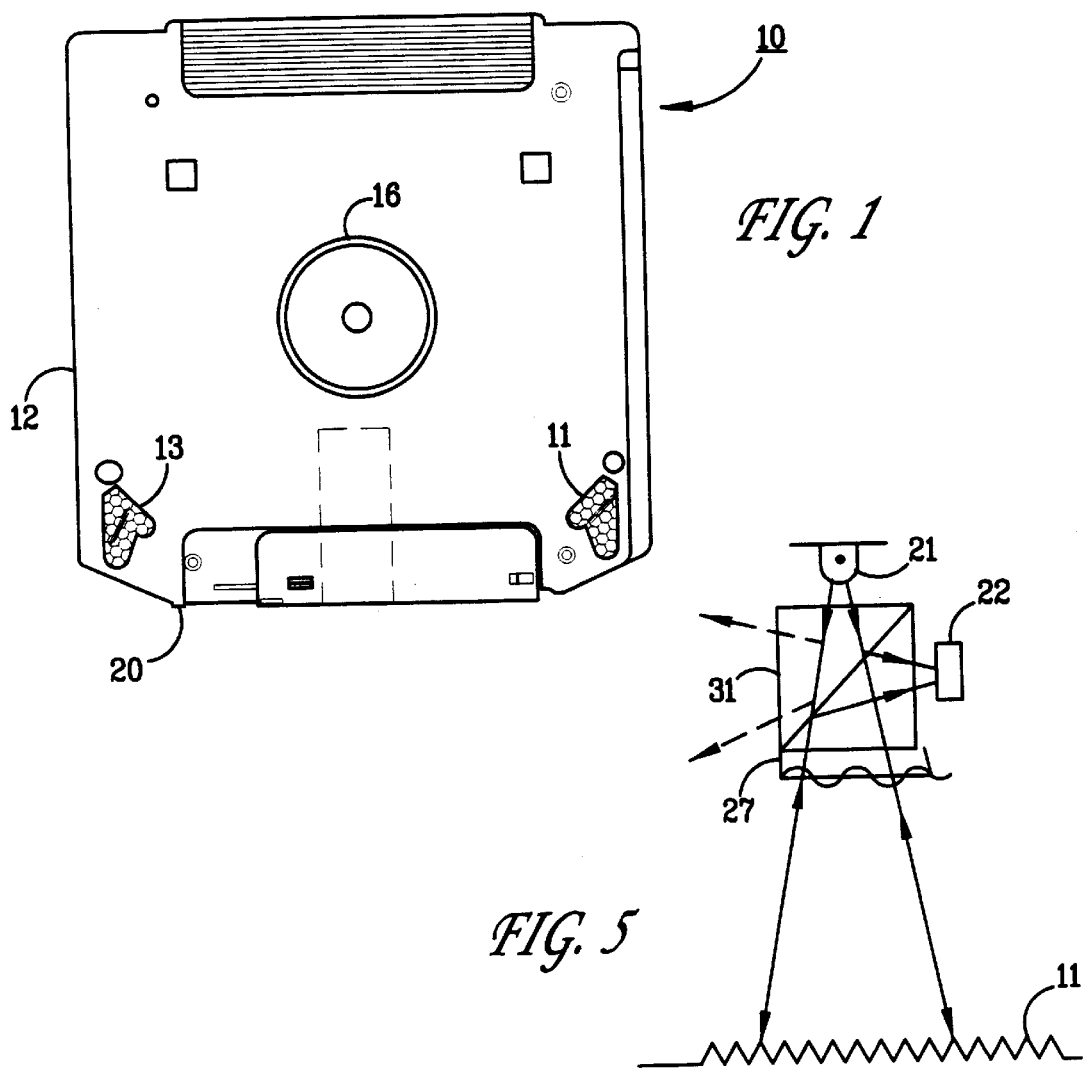
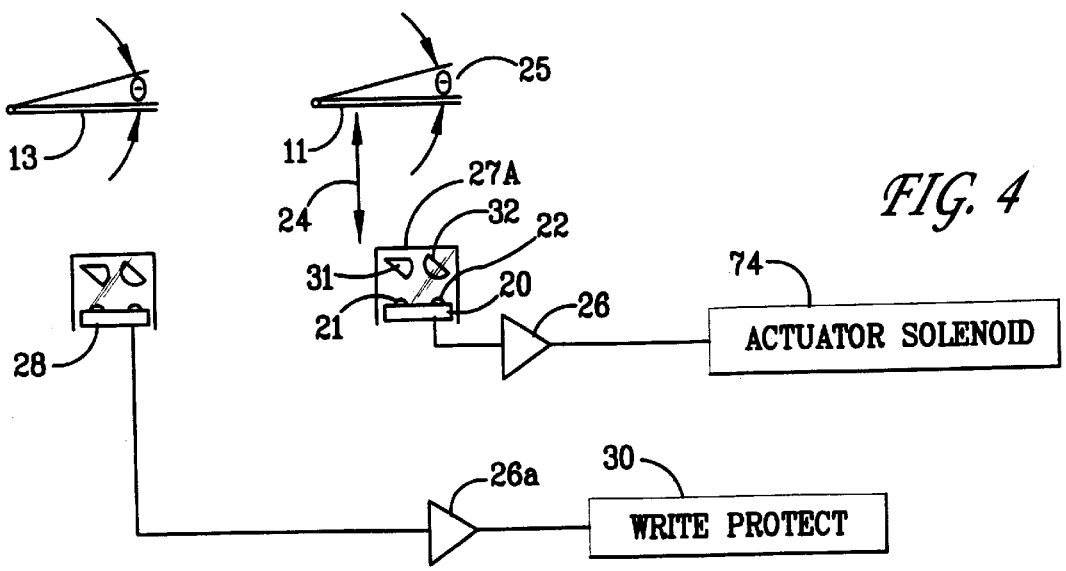

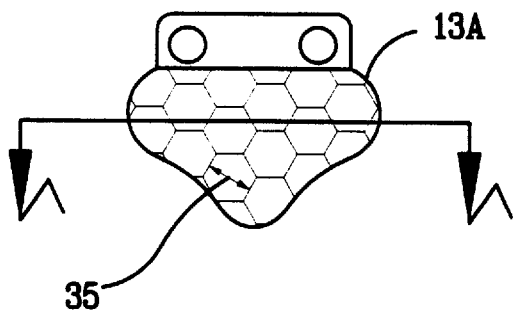
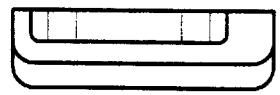
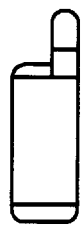
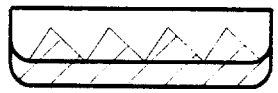
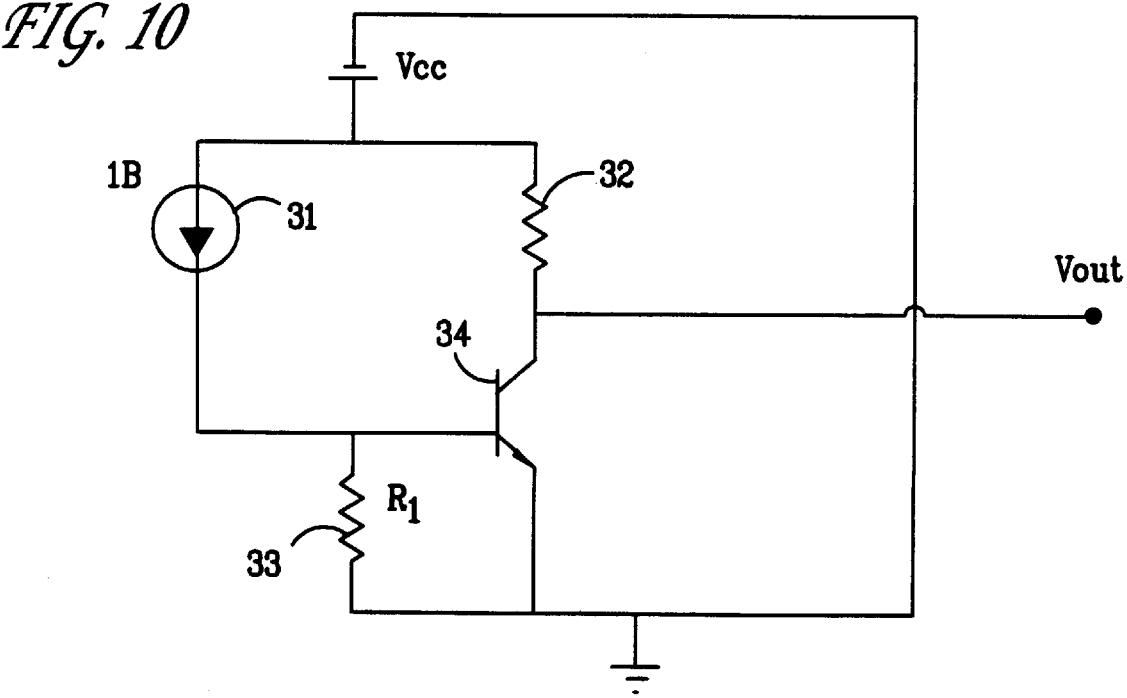

FIG. 13
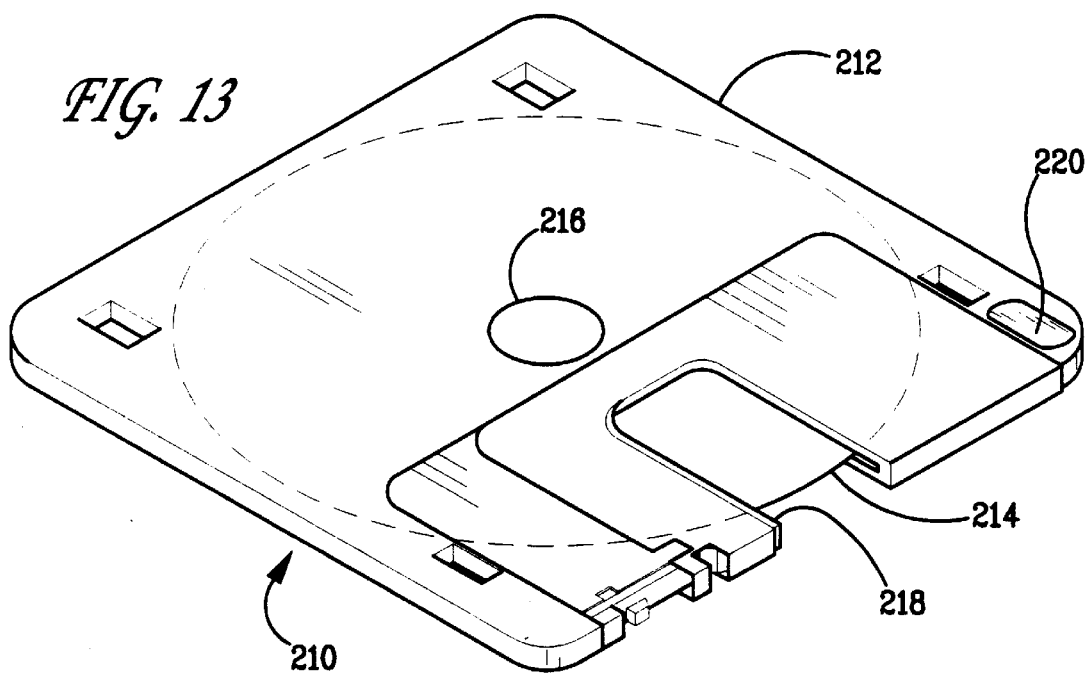
FIG. 14
FIG. 15
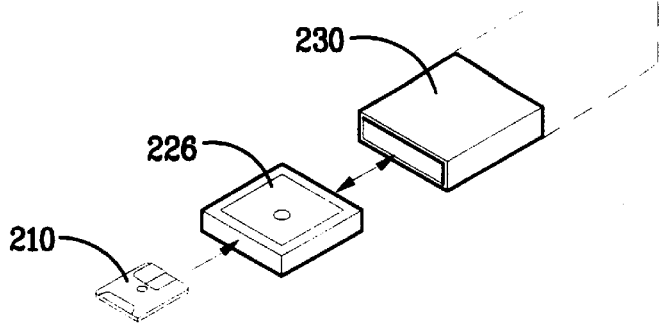

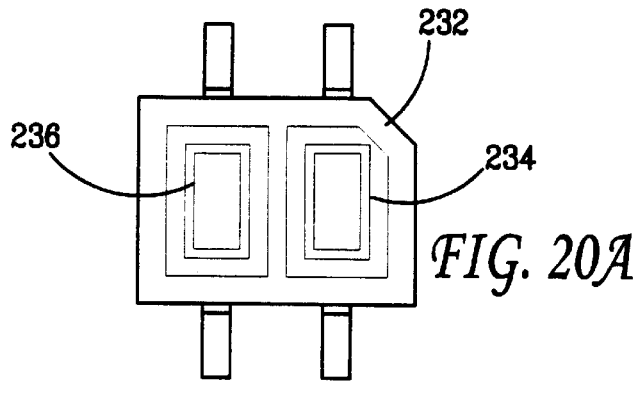
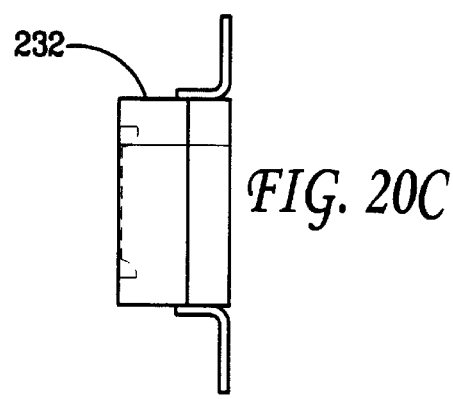
FIG. 20A  FIG. 20C
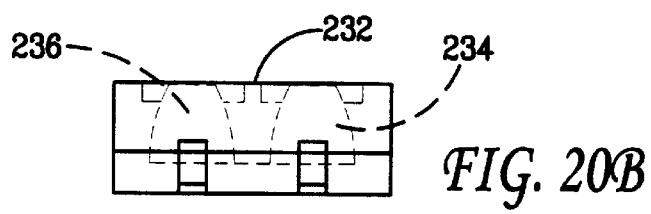
FIG. 20B
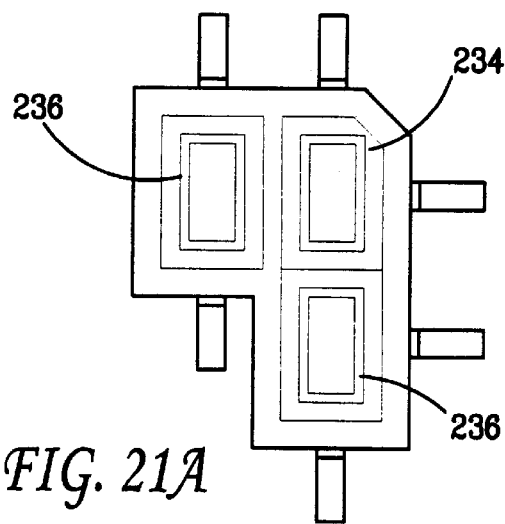
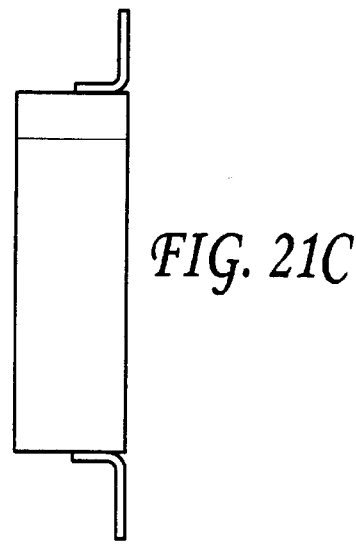
FIG. 21A  FIG. 21C
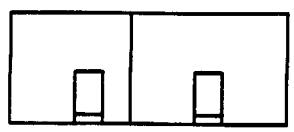
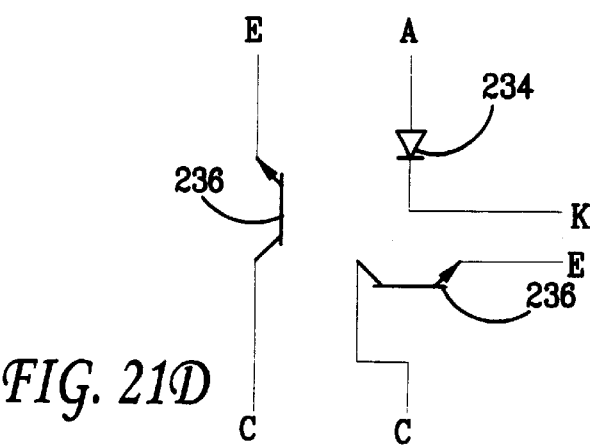
FIG. 21B  FIG. 21D FIG. 29
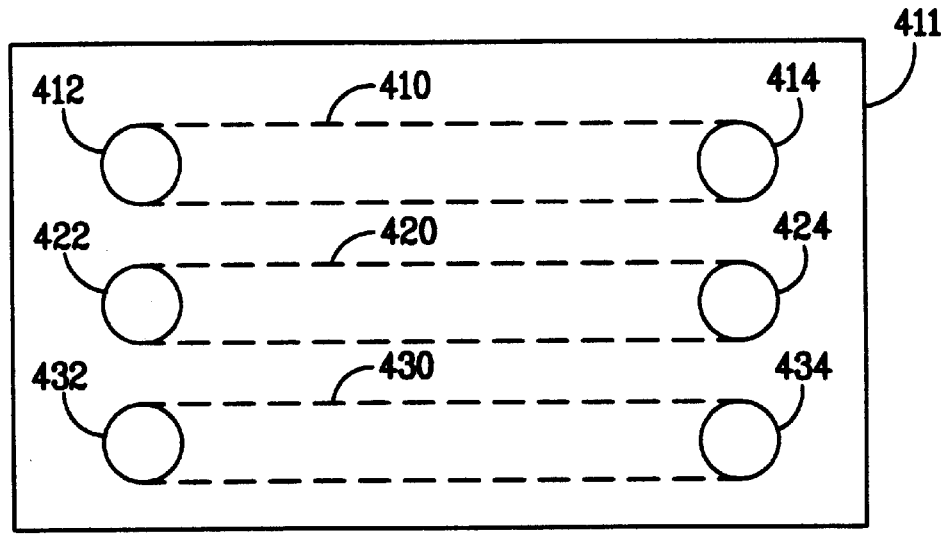
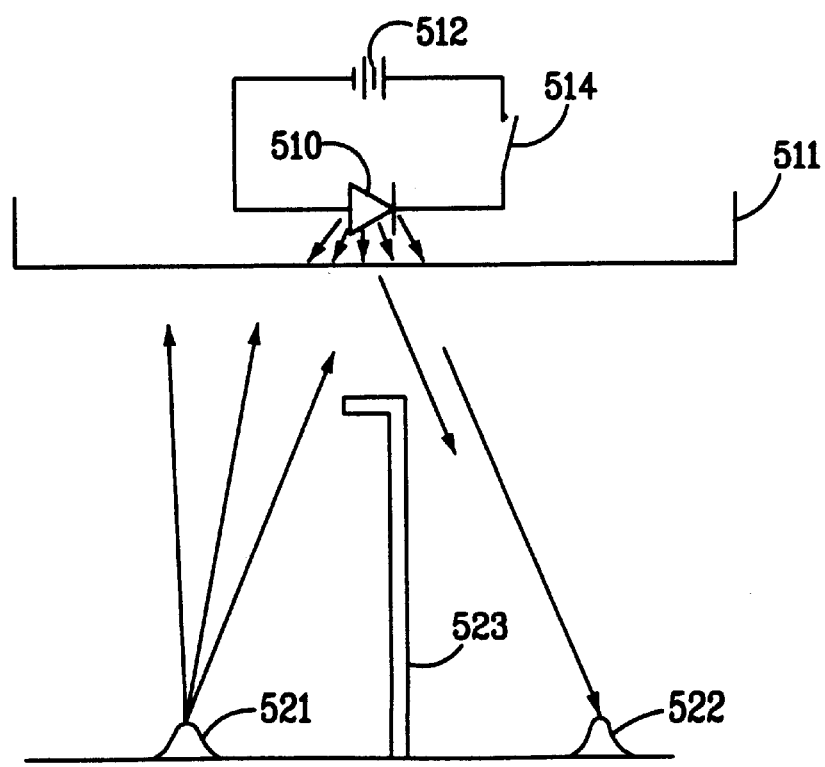
FIG. 30

DATA CARTRIDGE MARKER FOR FOREIGN OBJECT DETECTION

CROSS REFERENCE TO RELATED APPLICATIONS

This application is a continuation-in-part of U.S. patent application Ser. No. 08/931,272, filed Sep. 15, 1997, entitled "An Improved Disk Drive for Detecting a Retroreflective Marker on a Data Storage Cartridge," now pending, the contents of which are hereby incorporated by reference in its entirety, and a continuation-in-part U.S. patent application Ser. No. 08/833,032, filed Apr. 3, 1997, entitled "Thin Retroreflective Marker for Data Storage Cartridge," now U.S. Pat. No. 5,986,838, the contents of which are hereby incorporated by reference in its entirety, which is a continuation-in-part of U.S. patent application Ser. No. 08/388,242 filed Feb. 14, 1995, entitled "Retroreflective Marker for Data Storage Cartridge," now U.S. Pat. No. 5,638,228, the contents of which are hereby incorporated by reference its entirety.

BACKGROUND OF THE INVENTION

The present invention relates to a marker for identifying an object in a system which includes a light source and a detector of light reflected from the marker. More particularly, the present invention relates to an improved disk cartridge having a marker thereon providing for serial reflections of incident light by which the cartridge creates a reflection pattern at a detector distinguishing the cartridge from foreign objects.

Generally, removable disk cartridges for storing digital electronic information comprise an outer casing or shell that houses a rotatable recording medium, or disk, upon which electronic information can be stored. As used in this application the term disk cartridge refers to any data storage device including tape drives. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge. The outer shell of the cartridge typically has some form of opening near its forward edge to provide the recording heads of the drive with access to the recording surfaces of the disk. A shutter or door mechanism is often provided to cover the opening when the cartridge is not in use to prevent dust or other contaminants from entering the cartridge and settling on the recording surface of the disk.

Disk drives for receiving removable disk cartridges, including conventional 3.5" floppy disk drives, must have some mechanism for detecting the insertion or presence of a disk cartridge in the drive. The actuator that carries the recording heads of the disk drive across the recording surfaces of the disk should not be allowed to move unless the presence of a disk cartridge is detected. In the prior art, mechanical switches are typically employed to detect the presence of a disk cartridge within the drive. Such switches are typically positioned such that when a disk cartridge is inserted fully into the drive, the cartridge contacts the switch, thereby providing an indication that the disk cartridge is present.

When a data storage cartridge is inserted into a drive it is important that the type of cartridge be recognized by the drive as the correct type of cartridge so as to insure safe and reliable use in the drive. Most removable cartridge drives (magnetic and optical) typically use approximately the same form factor cartridges, i.e., 3.5", 5.25", etc. Hence if one of these cartridges is inserted into the cartridge slot of the non-mating drive, there is a large probability that either the drive (heads, load mechanism, electronics, etc.) or the data on the disk could be damaged.

Also, some cartridges are "write protected" by the user to prevent accidental erasure of important data by writing over it. It is important to protect against operation of the drive when an incorrect or write protected cartridge is inserted.

Iomega Corporation, the assignee of the present invention, manufactures several models of data drives, including the Zip™ disk drive, which is available in a desk top and notebook computer version. These drives and the related data cartridges provide data densities 70 times greater than regular floppy disk drives. In order to provide the market place with this product, Iomega ingeniously designed a hard/Winchester drive technology that could read and write data on a removable flexible disk substrate. By providing a removable disk cartridge, Iomega was presented with the problem of foreign objects coming into contact with the extremely fragile read/write heads.

Generally, foreign objects include any object that is not intended for insertion into the data cartridge slot of a drive. For the Zip™ family of drives, foreign objects include any object that is not a Zip™ data cartridge. Such items include 3.5" floppies, candy bars, rulers, office index cards, sport collector cards, etc. Further, in the case of future versions of the Zip™ drives which might not be designed for use with cartridges for earlier versions of Zip™ drives, such cartridges for earlier drive versions could also be considered foreign objects.

"Foreign objects" which go undetected upon insertion into the drive may cause damage to or entirely destroy the delicately suspended read/write heads of the drive if it attempts to read/write data to the foreign object. If damaged, the heads can destroy subsequently inserted data cartridges and the data stored thereon.

Further, an undetected foreign object causes the motor in the drive to spin up. The motor has a hard pointed steel centering pin for mating and aligning valid data cartridges. The pin spins at approximately 3000 RPM and acts as a grinding wheel or drill on the surface of "foreign objects" which may be inserted. As a consequence, small particles of abrasive debris are generated in the drive. These particles may migrate into a later inserted valid data storage cartridge and destroy the data located thereon by scratching the soft magnetic storage media.

Recently, retroreflective materials have been developed. Typically, retroreflective material has many periodic miniature corner cubes, or spherical elements, which reflect light almost exactly upon its incident path. Retroreflective array materials are described in Jacobs, S. F., "Experiments with retrodirective arrays," *Optical Engineering,* Vol. 21, No. 2, March/April 1982; Rennilson, J., "Retroreflection—What is it and how is it used?" *ASTM Standardization News,* February 1982; and Venable, W. H., Stephenson, H. F. and Tersteiege, H., "Factor affecting the metrology of retroreflective materials," *Applied Optics,* Vol. 19, No. 8, Apr. 15, 1980, the contents of both of which are hereby incorporated by reference.

Applicant has recognized that a need exists for a cartridge marker that can be used to discern between valid cartridges and foreign objects. Further, there is a need for a data cartridge marker which can operate in multiple disk drive embodiments having varying emitter/detector arrangements. Also, there is a need for a marker which can be switched so as to allow for use in multiple drives.

It is therefore desirable to provide a data cartridge which provides for more reliable discerning of foreign objects. Further, it is desirable to provide a data cartridge which can adaptably be used in disk drives having varying emitter/detector configurations.

SUMMARY OF THE INVENTION

Accordingly, it is the general object of the current invention to provide a data cartridge for delineating between a valid cartridge and a foreign object.

Briefly, this object, as well as other objects of the current invention, is accomplished in a cartridge for use in a data drive. Said cartridge comprises the following items: an outer casing having top and bottom surfaces; a magnetic media rotatably disposed within the outer casing; a head access opening in a front peripheral edge of the outer casing; and at least one reflector disposed on at least one of the top and bottom surfaces of the outer casing. The at least one reflector reflects light incident thereon from one point on the at least one reflector to a second point on the at least one reflector.

In one variation of this embodiment, at least one reflector is positioned proximate the front peripheral edge of the outer casing. In another variation, at least one reflector reflects at least a portion of light traveling along a first path in a direction along a second path wherein the second path is substantially parallel to the first path. The outer casing may be substantially rectangular in shape, having two front corners proximate the front peripheral edge and two back corners. The at least one reflector may be positioned proximate at least one of the corners of the outer casing. The corner may comprise at least one of said front corners. The at least one reflector is indicative of a cartridge operable in a disk drive.

According to another aspect of the invention there is disclosed a magnetic disk cartridge comprising the following items: a substantially planar outer casing having a substantially planar surface; a magnetic media rotatably disposed within said outer casing; a head access opening proximate a front edge of said outer casing; and, a reflector attached to one of said planar surfaces. The reflector has a reflective surface such that substantially all light directed toward the substantially planar surface that is incident to the reflector at a first point is redirected to a second point upon the reflector and thereafter reflected away from the planar surface without passing through a plane of the substantially planar surface.

According to another aspect of the invention there is disclosed a cartridge comprising at least one reflector such that irradiance or light receive from a source of irradiance that is incident at a first point on the at least one reflector is reflected to a second point on the at least one reflector, and reflected to a point proximate the source of irradiance. The at least one reflector may comprise one or more fresnel lenses. The at least one reflector may alternatively comprise the following items: a first point of reflection for receiving light emanating from the source of irradiance; a second point of reflection for receiving light reflected from the first point of reflection and reflecting light which ultimately is detected by the detector of reflected light.

According to still another aspect of the invention, there is disclosed a cartridge comprising at least one optical pipe. The optical pipe has at least a first aperture and a second aperture. The optical pipe transmits irradiance from the first aperture of the at least one optical pipe to the second aperture of the at least one optical pipe.

According to another aspect of the invention, there is disclosed a cartridge comprising an irradiance emitting apparatus. The irradiance emitting apparatus may be a light emitting diode.

According to another aspect of the invention, there is disclosed a cartridge comprising a marker wherein said marker is rotatable relative to the cartridge and disk drive.

According to another aspect of the invention, there is disclosed a cartridge comprising a replaceable marker.

According to another aspect of the invention, there is disclosed a cartridge comprising the following items: a substantially planar outer casing; a magnetic medium rotatably disposed within said outer casing; and a mirror oriented on the substantially planar outer casing such that at least a portion of irradiance incident upon the mirror is reflected back to the receiver.

According to another aspect of the invention, there is disclosed a cartridge comprising a retroreflective surface wherein the retroreflective surface comprises at least one retroreflective element having a pitch.

The foregoing and other objects, features and advantages of the invention will be better understood from the following more detailed description and appended claims.

BRIEF DESCRIPTION OF THE DRAWINGS

FIG. 1 shows the data storage cartridge of the present invention;

FIG. 4 shows the emitter/detector of the present invention in a circuit controlling the enablement of the disk drive;

FIG. 5 shows an embodiment of the invention with a beam splitter;

FIGS. 6, 7 and 8 are plan, top and edge views respectively of a preferred embodiment of the invention;

FIG. 9 is a section on the section line of FIG. 8;

FIG. 10 shows a preferred embodiment of the detection circuit;

FIG. 13 shows the data storage cartridge of the present invention;

FIG. 14 is a perspective view of a device having a mini-disk drive of the type in which the invention is used;

FIG. 15 shows of how the mini- disk drive of FIG. 14 is compatible with a disk drive in a personal computer system;

FIGS. 20A–20C respectively show top, side and edge views of an emitter/detector pair positioned in the drive to detect the retroreflective marker;

FIGS. 21A–21D show top, edge, and sideviews and an electrical schematic of an emitter/detector system suitable for use in the drives;

FIG. 29 provides a view taken along line A—A of FIG. 28;

FIG. 30 provides a view of a marker incorporating a light emitting diode;

DESCRIPTION OF THE PREFERRED EMBODIMENTS

The present invention is directed toward data cartridge markers for use in discerning between valid data cartridges and foreign objects. Various embodiments of data cartridge markers in accordance with the invention are described below.

First Embodiment

Figure 2:
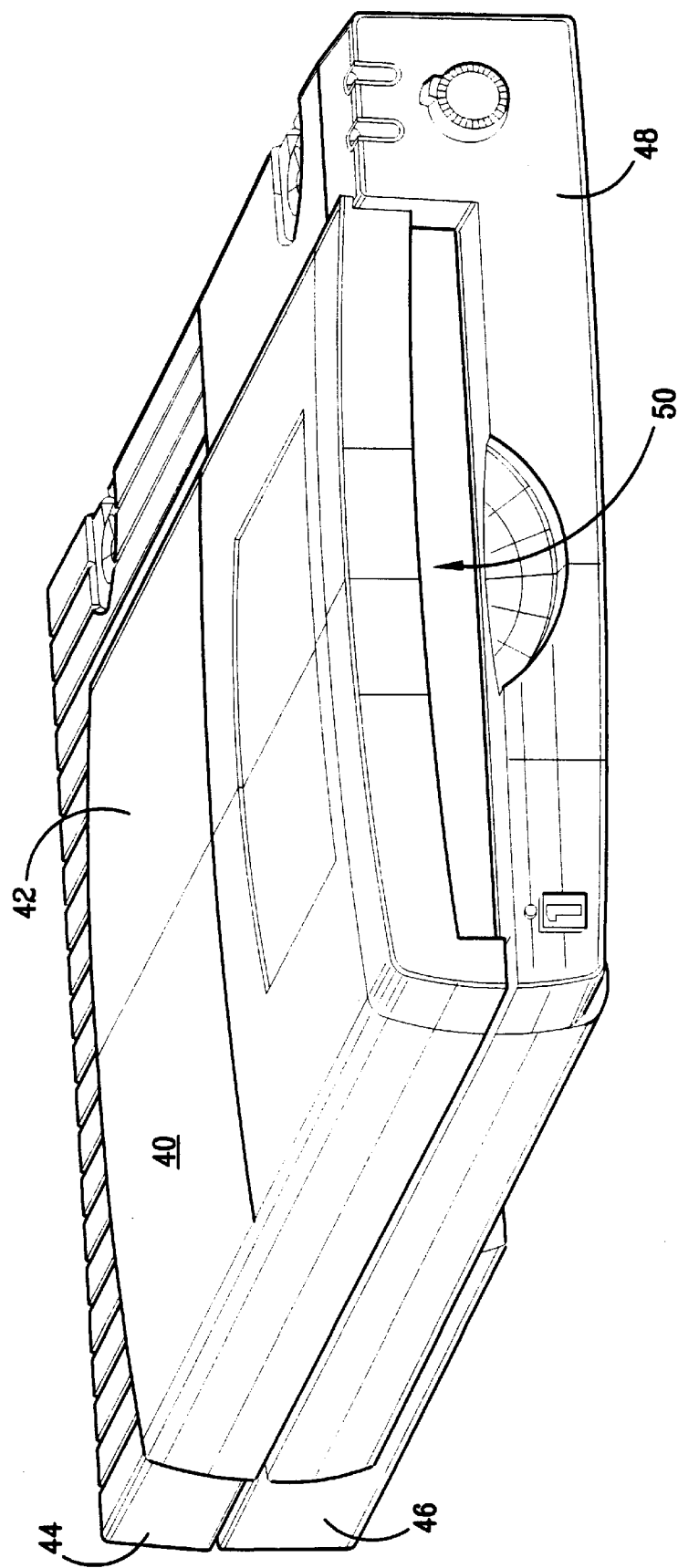
FIG. 2 is a perspective view of a disk drive of the type in which the invention is used.
Figure 3:
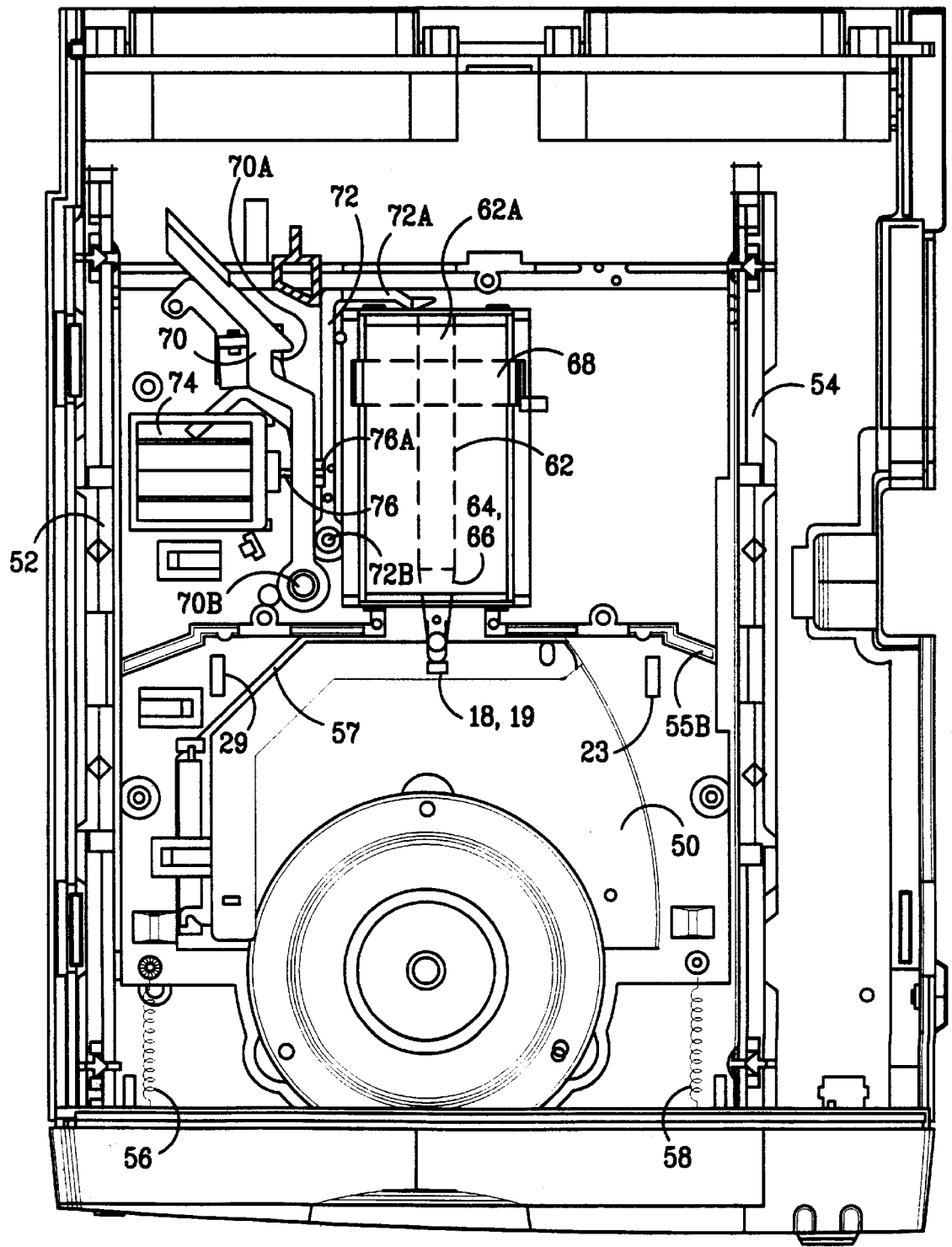
FIG. 3 is a top cut-away view of the disk drive of FIG. 2.

FIGS. 1–3 show a cartridge and a disk drive to which a first embodiment of the present invention is applicable. The cartridge and drive are described in applications entitled "Disk Cartridge and Data Storage Device For Receiving Same", Ser. No. 324,671, filed Oct. 18, 1994, now abandoned (Attorney Docket No. IOM-8907) and "APPARATUS FOR PERFORMING MULTIPLE FUNCTIONS IN A DATA STORAGE DEVICE USING A SINGLE ELECTRO-MECHANICAL DEVICE", Ser. No. 324,808, filed Oct. 18, 1994, now pending (Attorney Docket No. 8906). These disclosures are incorporated herein by reference.

The disk cartridge 10 comprises an outer casing 12 having upper and lower shells that mate to form the casing. A disk-shaped recording medium is affixed to a hub 16 that is rotatably mounted in the casing 12. An opening on the bottom shell of the casing 12 provides access to the disk hub 16. A head access opening in the front peripheral edge 20 of the disk cartridge 10 provides access to the recording surfaces of the disk by the recording heads of a disk drive.

In accordance with the present invention, a retroreflective marker, or tag, 11 is positioned on the cartridge to be detected by the detector in the disk drive. Further in accordance with the invention, a write protected marker 13 of retroreflective material may be applied to the cartridge if it is "write protected."

FIG. 2 shows a data storage device, in this case a disk drive 40, for receiving the disk cartridge 10 of FIG. 1. The disk drive 40 comprises an outer housing 42 having top and bottom covers 44, 46 and a front panel 48. A disk cartridge can be inserted into the disk drive 40 through a horizontal opening 50 in the front panel 48 of the disk drive 40.

FIG. 3 is a top view of the disk drive 40 for use with the present invention with the top cover 44 removed. The disk drive 40 comprises an internal platform 50 that slides along opposing side rails 52, 54 between a forward position and a rearward position. A pair of springs 56, 58 bias the platform 50 in its forward position.

A linear actuator is mounted on the rear of the platform 50. The linear actuator comprises a carriage assembly 62 having two lightweight flexible arms 64,66. The recording heads 18, 19 of the disk drive are mounted at the ends of the respective arms 64,66. A coil 68, which is part of a voice coil motor, is mounted at the opposite end of the carriage 62. The coil 68 interacts with magnets (not shown) to move the carriage linearly so that the heads 18 and 19 can move radially over respective recording surfaces of a disk cartridge inserted into the disk drive.

A head locking lever 72 is also pivotally mounted on the platform 50 about a rotation shaft 72b. A second spring (not shown) is coupled to head locking lever 72 at its rotation shaft 72b also to bias the head locking lever 72 in the X+ direction. An end 72a of the head locking lever, which extends at a right angle to the main shaft of the lever 72, is adapted to releasably engage an end 62a of the actuator carriage 62 when the carriage 62 is in a fully retracted position, thereby locking the carriage in place and preventing inadvertent movement of the recording heads 18, 19.

A solenoid 74 has a drive shaft 76. When the solenoid 74 is energized by an electrical current, the drive shaft 76 moves in the X+ direction from a normally extended position toward a retracted position. As the drive shaft 76 of the solenoid 74 moves toward its retracted position, an enlarged operating end 76a of the drive shaft 76 engages the eject latch and head locking levers 70, 72 in order to pull the levers in the X+ direction against their normal spring bias. Movement of the head locking lever 72 in the X+ direction causes the end 72a of the head locking lever 72 to disengage from the end 62a of the carriage 62, thereby unlocking the actuator and allowing the actuator to move radially of the rotating disk. Similarly, movement of the eject latch lever 70 in the X+ direction causes the cutout 70a on the eject latch lever to disengage from the latch projection 78 thereby releasing the platform 50 and allowing the platform 50 to move back to its forward position.

In accordance with the present invention, an emitter/detector pair 20 (FIG. 4) is positioned in the drive to detect the retroreflective marker 11 and to unlock the actuator.

The emitter/detector pair 20 includes an LED light source 21 and a detector 22. The emitter/detector pair 20 is positioned on the PC board of the disk drive so that light from the source passes through the slit 23 (FIG. 3) in the base plate, is reflected by marker 11, and travels on its incident path to be detected by detector 22.

The detector 22 is closely spaced to the LED emitter 21. Therefore, the detector will optimally respond to light which is emitted from the source 21, reflected from the retroreflective material in the marker 11, and is incident upon the emitter/detector pair 20 (E/D pair) along the same wavepath that the light was emitted. Because of the unique characteristics of the retroreflective material in the marker 11, the spacing between the marker 11 and the detector 13 is not critical. The spacing is denoted by the arrow 24. Similarly, the angular tolerance, denoted by the angle 25 is not critical.

The signal from the detector 22 is applied through suitable electronics 26 to enable actuation of solenoid 74, thereby allowing the drive to access the cartridge.

It can be shown that other reflective surfaces will not reflect sufficient light to the detector to produce actuation. Even a highly polished flat mirror will not reflect sufficient light to the detector because of the divergent nature of its reflection from a divergent source. Similarly, a diffuse reflector has so much scattering of light at the surface that the return will be at least an order of magnitude less than that from the retroreflective surface. Glass beads, or a reflective lens system (i.e., Fresnel) reflect about the same amount of light (assuming no absorption at the surface). The critical difference is the amount reflected back upon the incident path. This is about an order of magnitude better with a retroreflective array like Reflexite. Glass beads are close to being retroreflective, but the on axis reflection (back at zero degrees relative to the incident light) is about an order of magnitude poorer.

In order to further discriminate against detection of light from reflectors other than retroreflective ones, a prism lens cover 27 is provided. Internal curved optical surfaces expand the reflected optical irradiance such that its convergence is transferred to the detector in order that the return detected optical signal is maximized. The prism lens is used to redirect light reflected by the retroreflective array material back at its source toward the photo-sensor. If the appropriate prism lens is not used, the retroreflected light will be reflected back into the source LED.

Features may be added to the lens prism which help frustrate the use of other types of reflective materials and also the use of a lens in conjunction with other reflective materials. For example, surface roughness or waviness of the top of the lens prism which has a spatial frequency of less than the pitch of the retroreflective elements (0.006") will be corrected for optically using the retroreflective cartridge marker. This will frustrate the use of both ordinary mirrors and reflectors used in conjunction with lenses. Just putting an angular surface on the front face of the prism lens will frustrate the use of polished mirrors if the angle is made large enough, the corrective polished mirror that would be required is of such a large tilt angle that it would be difficult, if not impossible, to locate on a cartridge. If a mirror is oriented just right, some light will get back to the receiver, but this amount decreases in an exponential manner as the mirror is moved away from the source. This is not the case with the retroreflective material. The decrease with distance is linear with a very gradual slope.

In accordance with the invention, a retroreflective write protection marker 13 may be provided on the cartridge. The presence of this marker is detected in a manner similar to the detection of the marker 11. An emitter detector pair 28 (FIG. 4) detects marker 13 through slit 29 (FIG. 3) in the base plate. The detector is applied through suitable electronics 29 to the write protect circuitry 30. This is used for write protection on the cartridge.

FIG. 5 shows an embodiment of the invention in which a beam splitter 31 redirects the reflected light to the detector 22. This embodiment is useful where the source 21 is not in the same package as the detector 22.

Appropriate optical baffling such as that disclosed in U.S. patent application Ser. No. 08/931,272, the contents of which are hereby incorporated by reference in its entirety, can be used and optical element surface angularity can be used to reduce emitter back scatter to the detector which is a source of cartridge detection noise.

Retrodirective or optical phase conjugate-type materials are included within the definition of retroreflective as used herein. One commercial material suitable for use is available from Reflexite Corporation, under their designation "AP 1000" or Relexite. This is a thin plastic sheet material with tiny (0.006" pitch) retroreflective elements embossed into it. This embodiment requires a "lens prism" such that the reflected light will be redirected into the detector (phototransistor).

Figure 11:
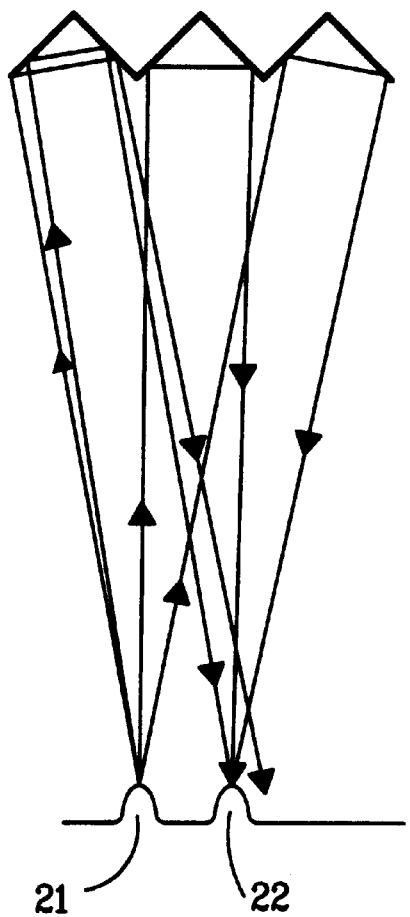
FIG. 11 is a ray trace of some diffuse source rays returning from the tag to the detractor.
Figure 12:
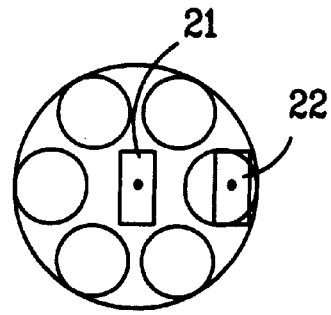
FIG. 12 shows the reflected irradiance distribution.

In order to reduce the cost of implementing the invention, an acrylic retroreflective marker, or tag 13, shown in FIGS. 7–9 is used. This tag is an array of retroreflective corner cubes whose pitch and flat-to-flat distance is slightly greater than the distance between the emitter/detector (E/D) pair used to sense the tag. The pitch on the tag's corner cubes is 94 mils while the LED is spaced 70 mils from the phototransistor in the E/D pair. The E/D pair senses a fairly reflective object at 0.7 mm. The distance in the drive from the pair to the cartridge is about 13 mm. The ability to sense the tag at this long distance comes from the fact that each corner-cube element (9 in tag of the preferred embodiment) reflect the diffuse light incident on them back at the LED with an illuminance profile that is annular. If a retroreflector has a size (diameter) which is slightly greater than 70 mils, i.e., 94 mils, the returned light distribution from each retroreflective element will have a donut shaped distribution around the center of the emitter. The donut's radius will about 94 mils. As can be seen from FIGS. 11 and 12, a segment, or lobe, of this donut illuminates the detector 22. There are six peak lobes in the irradiance distribution of FIG. 12. This is from the hexagram shape of each element in the tag 13. (See FIG. 6).

Not as much light is returned to the detector as with the embodiment of using a sheet material such as Reflexite, but there is significantly more than returned from a diffuse reflector or a polished mirror.

The OD radius of the donut is approximately the diameter, or flat-to-flat, distance of the corner cubes, i.e., 94 mils. Hence, the phototransistor at 70 mils from the center of the LED views a segment of this reflected annular illuminance. Reflection off a polished mirror or white piece of paper at this distance is so diffuse and angle insensitive that the illuminance return to the phototransistors aperture is small by comparison.

As further illustration, if the retroelements were 1" in diameter, the return donut of light would be 2" in diameter. From this example, it can also be seen that in order to maximize the return to the detector using this retroreflection scheme, it is important to only oversize the retro element's diameter slightly larger that the spacing between the illuminating and sensing elements (emitter/detector).

Hence, the differences in the return of light from the two retroreflective materials, Reflexite and a molded acrylic tag, are basically in the diameter of the returned spot of illumination. With the Reflexite, the retroreflected spot is about 12 mils. in diameter and requires the "lens prism" to redirect light to the detector for sensing.

It should also be noted that by getting rid of the "lens prism" some of the modes of discriminating against other types of light directing tags has been reduced.

A suitable emitter/detector is commercially available, for example, from Sharp Corporation and designated Model No. GP 2S27. It is the E/D pair 31 in the circuit of FIG. 10. Resistor 32 is 10 K and has a tolerance of +/−5%. The 2N3904 transistor 34 has a +/−50% tolerance on its Beta, the E/D pair 31 has a 2:1 range for phototransistor output current given a particular reflective target. The optical elements in the tag marker 13 have a maximum variance range of about 20% in their reflective efficiency.

Based on test data and some simulations, resistor 33 in the circuit was selected to be 50 K ohms to give adequate sensitivity to the tag while also providing significant rejection to diffuse or specular reflective tag substitutes. Tests show that there is close to an order of magnitude difference in the output signal from E/D pair 31 for a typical (avg.) retroreflective tag and typical (avg.) E/D pair versus the output seen from a mirror or white piece of paper by a hot E/D pair. The tests also show that there is about a 2 to 2.5 times margin between the signal seen from a specular or diffuse tag substitute and the cartridge detection threshold. The preferred embodiment also includes some margin for low end E/D pairs with low end tags which are scratched or otherwise optically degraded through use. The detector still functions with these low end conditions.

Second Embodiment

The above described cartridge and disk drive may not be best suited for every application. Recently, very small mini-cartridges have been developed for use in miniature disc drives. These mini-drives are incorporated into hand-held devices such as digital cameras, electronic books, global positioning systems, cellular phones and the like. "INTERCHANGEABLE CARTRIDGE DATA STORAGE SYSTEM FOR DEVICE PERFORMING DIVERSE FUNCTIONS", Ser. No. 08/746,085 filed Nov. 11, 1996, Edwards, et al. (Attorney's Docket IOM-9319) describes such mini-cartridges, mini-drives, and hand-held devices. This application is incorporated herein by reference.

The mini-cartridge's data storage disk has a total thickness of about 2.5 mm. As disk storage products become smaller and smaller the need for a cartridge marker of thinner physical size is required. The aforementioned mini-cartridge has such a requirement. The present invention provides a solution to this requirement while maintaining the functionality of the retroreflector invention.

The ability to discriminate between cartridge types after insertion into a data storage device but prior to putting the read/write heads on the recording media is of significant value and utility. Principally this utility comes from the ability to detect the difference between various capacities or generations of data storage cartridges in a downward media compatible data storage drive. This discrimination capability allows for drive/media specific adjustments to be made such as media rotation rate, data channel rates, location of Z track for initial seeking, or even mechanical adjustment in the drive like the active engagement of new crash stop locations.

A "caddy" cartridge, as mentioned in the aforementioned Edwards, et al. application provides cross drive platform compatibility, for example between mini-cartridges and personal computer cartridges. The ability to recognize the installation of a "caddy" into the drive prior to spinning up of the "caddy" and loading of heads is necessary. Again rotational speed adjustments, Z track location information, data channel rate and crash stop/ID and OD data track location information must be determined prior to read/write head loading. This invention provides a solution of these problems also.

Another problem associated with the detection of LED light reflected from any reflective material is the occurrence of illuminance hot spots or structure in the LED output which often results in uneven illumination of the cartridge marker. Since these are typically randomly located the effect on the amplitude of the reflected return is variable. A smoothing or homogenizing of reflected light in this type of system would be a significant improvement in system to system reliability.

FIGS. 13–15 show the cartridge and the disk drive to which the present embodiment of the invention is applicable. The cartridge and drive are described in the co-pending application entitled "Interchangeable Cartridge Data Storage Device For Performing Diverse Functions", Ser. No. 08/746,085, filed Nov. 6, 1996 (Attorney Docket No. IOM-9319). This disclosure is incorporated herein by reference.

The disk cartridge 210 comprises an outer casing 212 and a disk-shaped recording medium 214 which is affixed to a hub 216 that is rotatably mounted in the casing 212. An opening on the bottom shell of the casing 212 provides access to the disk hub 216. A head access opening in the front peripheral edge 218 of the disk cartridge 210 provides access to the recording surfaces of the disk by the recording heads of a disk drive.

In accordance with the embodiment of the present invention, a retroreflective marker, or tag, 220 is positioned on the cartridge to be detected by the detector in the disk drive.

FIG. 14 shows a lap top computer 222 which has a mini-disk drive 224 for receiving the disk cartridge 210 of FIG. 13. FIG. 15 shows how a caddy 226 provides forward compatibility to a host computer 228. Caddy 226 adapts the mini-cartridge 210 to a personal computer drive 230. The drive 230 may be the Iomega ZIP drive which is disclosed and claimed in U.S. Patents identified in the parent application.

Figure 16:
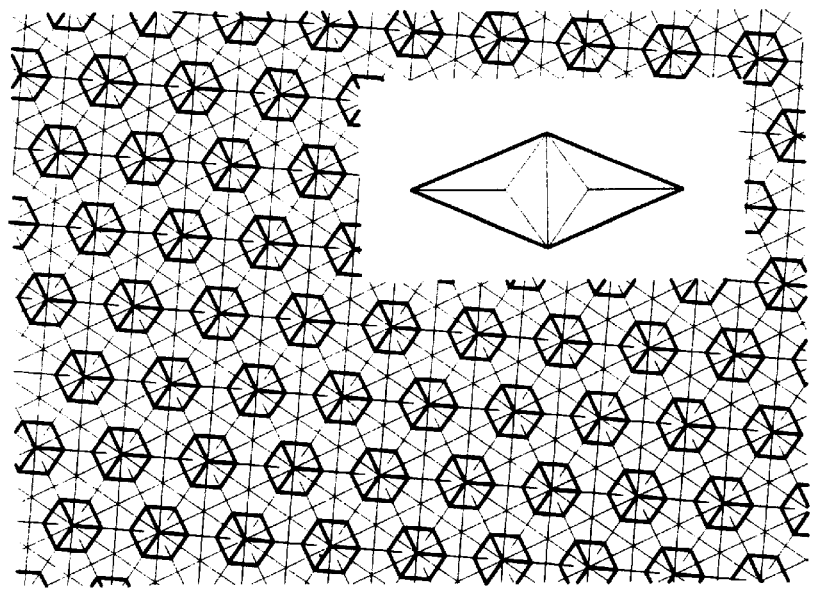
FIG. 16 is a photomicrograph of a retroreflective material suitable for use in accordance with the invention.

The retroreflective marker 220 on the mini-cartridge 210 must be very thin in order for the cartridge to fit in the thin form factor of the mini drive. In order to obtain a much thinner form factor for this cartridge, a thin sheet of plastic retroreflective material is used in the principle embodiment of this invention. Material suitable for use is described in Jacobs, S. F. "Experiments with retrodirective arrays," *Optical Engineering,* Vol. 21 No. 2, March/April 1982, and in Reflexite Corporation Brochure NA2020, Pub. 4/93. "Reflectors for Photoelectric Controls." One suitable material is referred to as Reflexite. It has corner cube retroreflectors with a nominal size or diameter of 0.006". There are about 47,000 retroreflectors per square inch of material. Although Reflexite is presently preferred, any dimensionally small retroreflective material can be used. FIG. 16 shows a photo micrograph of the miniature corner cube retroreflective material.

Figure 17A:
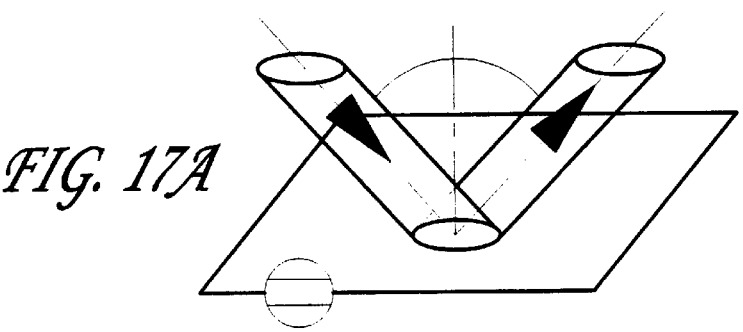
FIGS. 17A–17C depict the reflection of light from a smooth surface, from a rough surface, and from a retroreflector, respectively.
Figure 17B:
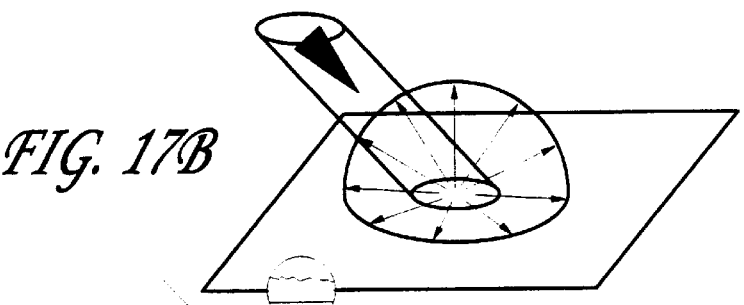
Figure 17C:
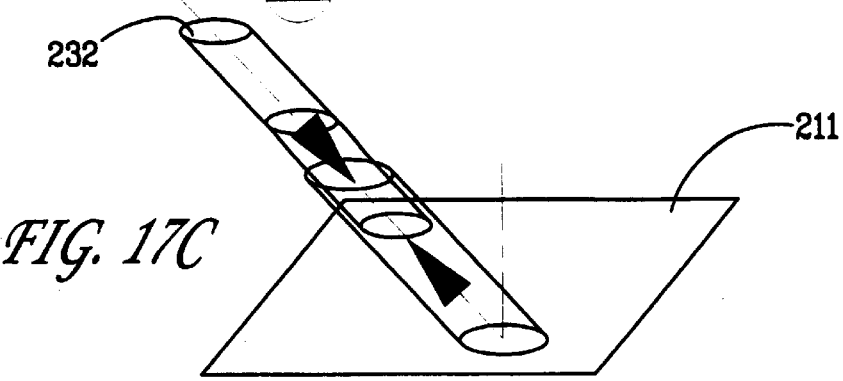

FIGS. 17A–17C illustrate retroreflection versus other modes of reflection. As shown in FIG. 17A, a smooth reflector will reflect light at an angle equal to the angle of incidence. As shown in FIG. 17B, a rough or specular reflector reflects light in all directions. FIG. 17C depicts retroreflection wherein light from the emitter/detector system 232 is reflected from retroreflective marker 220 back toward the emitter/detector system 232. The corner cube structure of the reflectors on the marker 220 returns or reflects the light back at the emitting light source. The size of the retroreflector for these near field reflections (short working distances) has a dominant effect on the size of the reflected lobe of light seen back at the emitting source. For this application this lobe needs to be large enough to encompass the aperture of the detector in close proximity to the light source (LED). In the Zip drive this distance is on the order of 0.070". The width or size of the ZIP cartridge retroreflectors is 0.094" thereby providing sufficient overlap of returned light into the aperture of the detector.

However, the thin retroreflective marker used on the mini cartridge will direct light back onto the emitter without illuminating the detector. If material of the dimensional size of Reflexite is used for the retroreflective marker almost all of the light from the LED is reflected back into the emitting aperture of the LED and none is incident onto the aperture of the detector. In order to appropriately redirect a significant portion of the reflected light into the aperture of the detector (phototransistor) a planar surface relief optical structure 234, is placed in front of the retroreflective material 236, as is shown in FIG. 14B. Holographic light shaping diffusers, ruled or blazed diffraction gratings, binary optics, holographic diffraction gratings or micro refractive lens arrays will perform the function of redirecting light into the aperture of the detector.

A surface relief hologram is produced by holographic construction of randomized refractive structures. These micron size features are able to provide a high efficiency diffusion element which can be directionally oriented. The degree of angular diffusion in orthogonal axes can be made to be different using this technique. Diffusion angles between 0.2 degrees and 100 degrees in either axis are possible. These light shaping diffusers are referred to as LSDs. The refractive nature of the LSD provides the broadband functionality. Diffraction devices are much more wavelength sensitive. Film type surface relief holographic technology also provides broad spectral band performance. The same marker will work equally well with a red LED or a near-IR LED. LSD's which are suitable for use are described in Leaner, JM, She, R., Petersen, J., "Holographic Light Shaping Diffuses," presented at: The Aerospace Lighting Institute, Advanced Seminar, February 1994, Los Angeles, Calif. and in Physical Optics Corporation Brochure JL1-493, "Light Shaping Diffusers."

By placing an LSD 234 in front of the retroreflective material the size and orientation of the reflected distribution of light can be controlled quite accurately. This distribution of reflected light at the emitter/detector pair is a function of both the diffusion angle of the LSD and the distance between this reflective marker and the emitter/detector pair.

Figure 18A:
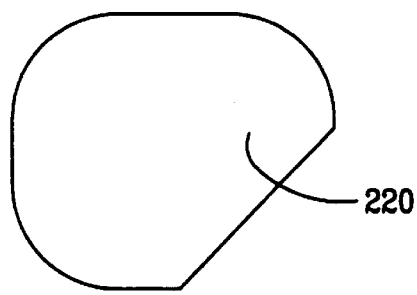
FIGS. 18A, 18B and 18C show a plan view, an edge view and an exploded perspective view of one embodiment of the invention.
Figure 18B:
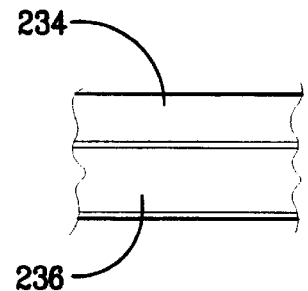
Figure 18C:
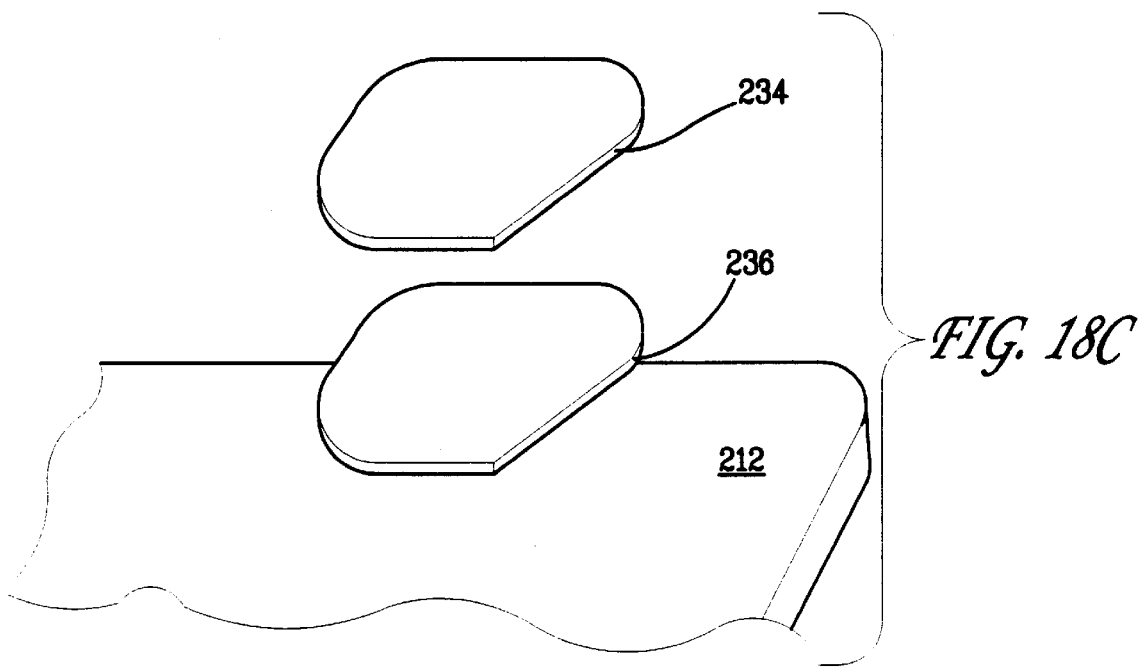
Figure 19:
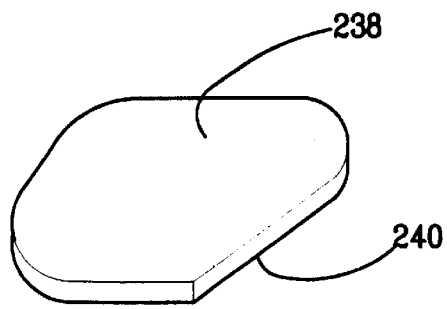
FIG. 19 shows another embodiment of the invention.

FIGS. 18A–18C show a thin marker which, in one embodiment, is only 0.4 mm thick. Thinner embodiments are possible using different types of optical films. The embodiment shown in 18A–18C uses an optically clear adhesive to laminate the LSD film 234 to the Reflexite film 236. Another embodiment, shown in FIG. 19, has only one sheet of thin plastic. The LSD 238 is embossed on one side and the micro-retroreflective array 240 is embossed on the other side.

The figures in the Physical Optics Corporations Brochure JL1-493 "Light Shaping Diffusers" illustrate the homogenizing effect of the LSD on a structured illuminance source. An LSD in combination with the Reflexite material provides not only an accurately placed distribution of light, but also it provides a homogenized reflection of the LED light source even if there is significant structure in its illumination profile. Hot spots in the output are obliterated.

FIGS. 20A–20C show the layout of a suitable emitter/detector pair 232 which includes LED 234 and phototransistor 236.

Because the diffusion angles of the LSD can be made significantly different from one axis to another an elliptical distribution of light can be redirected back at the detector. The figures in the Physical Optics Corporation Brochure also illustrate this bi-axial differential diffusion ability. This ability in combination with the addition of more than one detector element in close proximity to the LED emitter allows for detection of the spatial orientation of the marker's reflected light and hence cartridge type discrimination.

FIGS. 21A–21D depict an emitter/detector system which includes two detectors 236 and an emitter 234. FIG. 21D depicts the electrical components with the legends E for emitter, C for collector, A for anode, and K for cathode. The "emitter/detector system" includes two light detectors (phototransistors) 236 which are on orthogonal axes in close proximity to the LED light source 234.

Figure 22A:
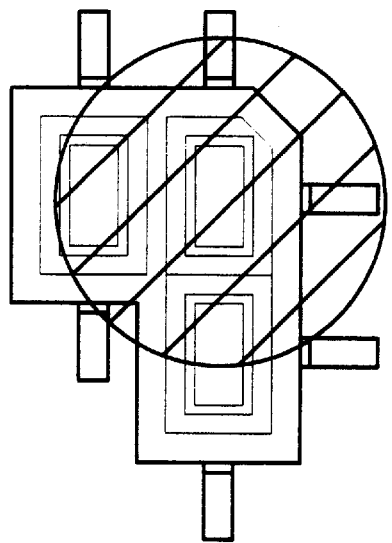
FIGS. 22A–22D show the descriminatable retroreflective states using a LED/detector system such as that of FIG. 21.
Figure 22B:
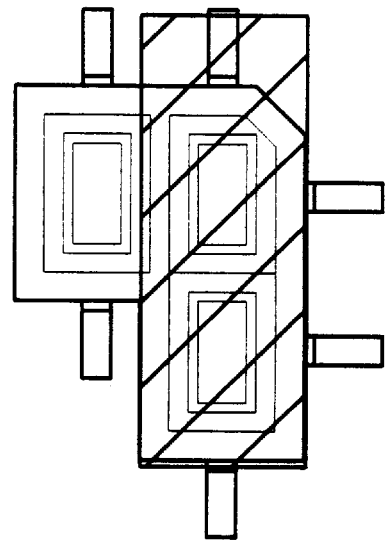
Figure 22C:
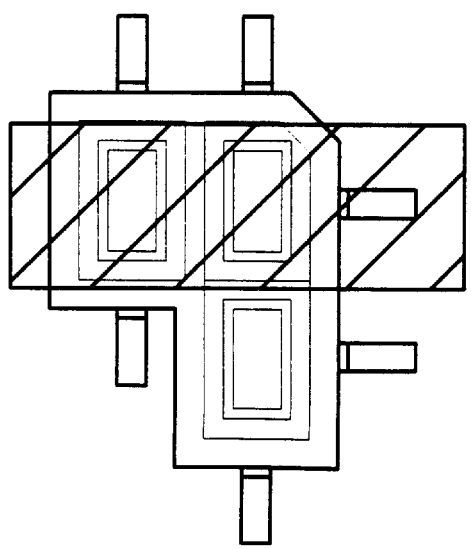
Figure 22D:
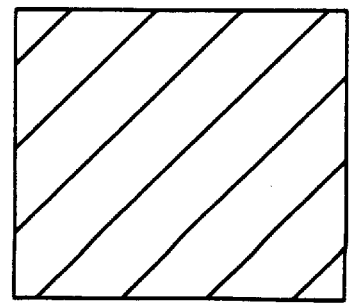

FIGS. 22A–22D illustrate the three possible detectable or discriminatable states using the two (2) orthogonally placed detectors. State 1 is shown in FIG. 22A, state 2 in FIG. 22B and state 3 in FIG. 22C. FIG. 22D shows the legend for the reflected light distributions in FIGS. 22A–22C. An example of the application of this three state system would be in a future higher capacity ZIP drive. "State 1" would alert to the insertion of a ZIP 100 cartridge, "State 2" would alert to the insertion of a ZIP 200+ cartridge and, "State 3" would alert to the insertion of a mini-cartridge "caddy".

Addition of a third detector element allows for the detection and discrimination of 7 possible states. Any number of multiple detectors arrayed around the light emitting source provide an exponentially increasing number of descriminatable states.

In one variation which has been described, the hologram produces an elongated pattern of illumination by orientation of the angle of diffusion. Alternatively, the reflected light might be a spot or multiple spots oriented relative to the emitter in a desired manner to provide appropriate detection and discrimination functionality or utility.

Third Embodiment

Of course, various alternative marker embodiments may also be employed as compared with those discussed above. As with all of the embodiments described herein, light emmenating from an emitter in a disk drive is reflected off of a first point toward at least a second reflective point, and from this second reflective point is directed toward and received by a detector located in the drive. Thus, the embodiments involve the use of multiple serial reflections to direct reflected light and generate a pattern of reflected light that is other than that produced by flat specular (mirror like) or flat diffuse foreign objects.

Applicant has disclosed above a retroreflective marker which typically employs three internal reflections prior to detection by a detection means. In the present embodiment, two serial reflections is alternatively sufficient. Applicant has determined that a marker in accordance with this embodiment operates most effectively when the first surface point from which the light ray reflects is at least about 0.25 mm in distance from the second surface point upon which the light reflects. A distance of at least 0.25 mm effectively distinguishes from multiple reflections that possibly might be encountered in foreign objects.

Figure 23:
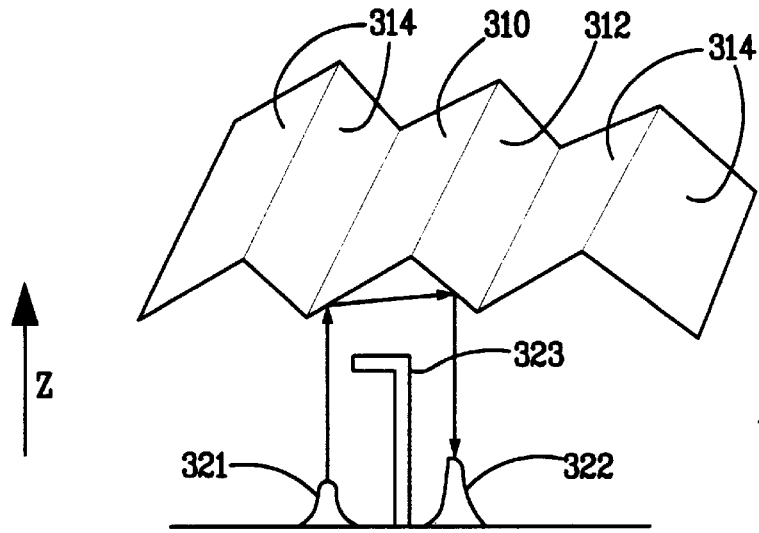
FIG. 23 provides a view of a marker embodiment having a series of two triangularly arranged reflective surfaces.

Referring to FIG. 23, an embodiment of the invention is shown having a series of two triangularly arranged reflective surfaces aligned next to each other. A light ray, which is depicted with an arrow, exits emitter 321 and is reflected from first surface 310, to second surface 312, and down to light detector 322. A baffle 323 such as that described in U.S. patent application Ser. No. 08/931,272, which description is hereby incorporated by reference in its entirety, filters rays of light which are often associated with specular and diffuse reflective surfaces. In a preferred embodiment, the point where the light ray reflects from first surface 310 is at least about 0.25 mm from the point where the light ray reflects from second surface 312. Light exiting emitter 321 might also reflect from adjoining reflective surfaces 314 so as to be directed to detector 322 or additional light detectors (not shown).

Figure 24:
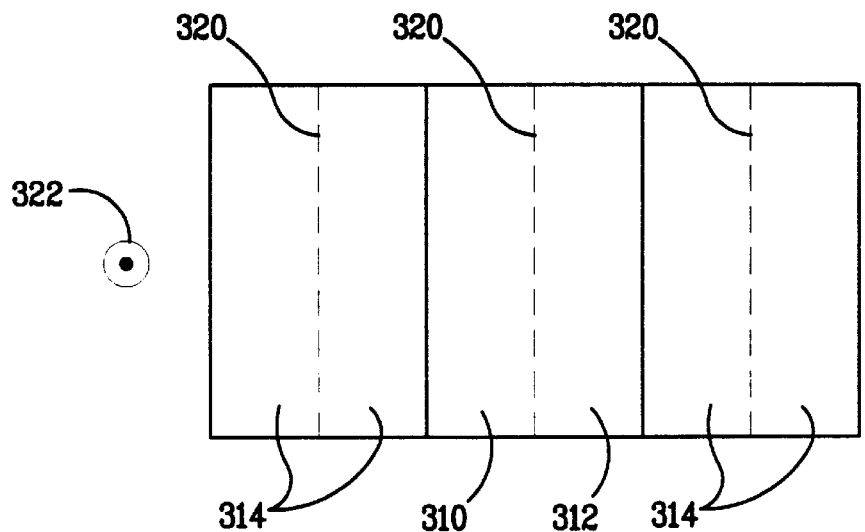
FIG. 24 provides a top view of the marker of FIG. 23.

FIG. 24 provides a top view of the marker shown in FIG. 23. Apexes 320 where each of two triangularly arranged reflective surfaces 314 meet are depicted by dotted lines. As shown in FIGS. 23 and 24, apexes 320 are generally aligned and substantially straight. However, apexes 320 might also be curved relative to the z axis 322 to enhance reflected intensity at one or more points. Further, apexes 320 might be staggered relative to other apexes 320 along the z axis to further direct reflected intensity.

A single reflective fresnel lens or an array of reflective fresnel lens' is an exemplary embodiment in accordance with the description above. A reflective fresnel lense is a flat, thin piece of material in which are molded a series of small stepped zones or grooves which are coated with aluminum or a similar material. These grooves may be concentric, linear or in some other densely packed arrangement. Each groove is a minute reflecting facet like those described above with reference to FIG. 23 which is capable of bending light to a common focal point or multiple common focal points. Each groove acts as a reflective lens. Two or more reflections from points on a fresnel lens may be employed to direct light or irradiance to a detector. Taken together, multiple facets or grooves function as a true lens or multiple lenses.

Figure 25:
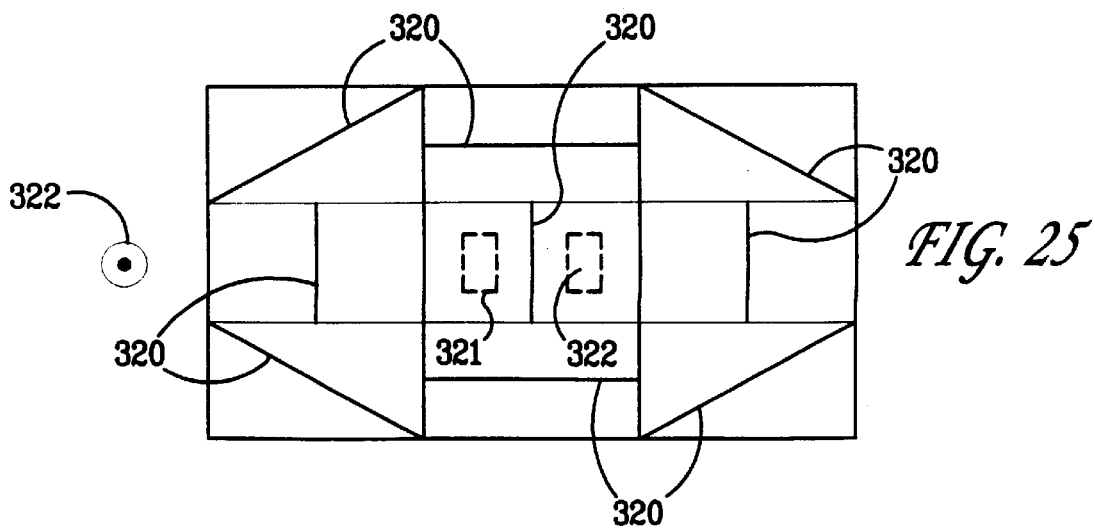
FIG. 25 provides a top view of an alternative version of the marker of FIG. 23.

FIG. 25 provides a top view of a variation on this embodiment of the invention. An array of reflector surface pairs 325 is arranged around emitter 321 and detector 322. An apex 320 of each reflector pair 325 is shown. Each of the reflector pairs 325 is arranged to direct light from emitter 321 to detector 322. Each pair of reflector surfaces 325 reflects light at least twice before it is directed to light detector 322. Again, each of apexes 320 may be curved relative to Z axis 322 for improved reflected light concentration.

Figure 26:
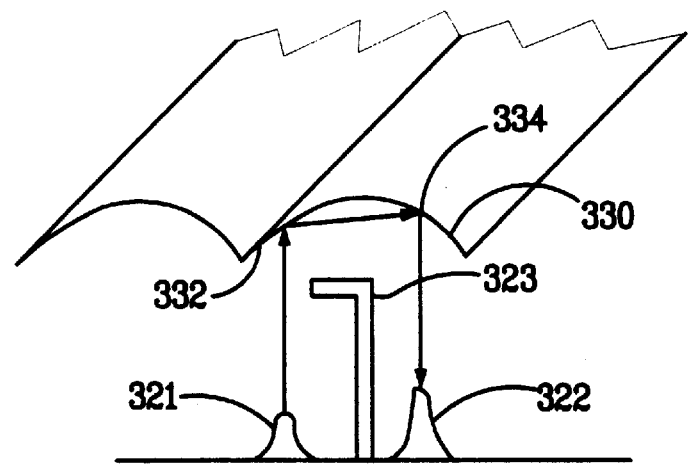
FIG. 26 provides a view of an alternative version of the marker of FIG. 23.

FIG. 26 provides still another variation of the disk marker embodiment. As shown, a single reflective surface 330 provides for more than one reflection prior to detection. Similar to the embodiment described with reference to FIG. 23, light is incident upon a first point 332 on surface 330 and thereafter reflects off of a second point 334 on surface 330 prior to being reflected to detector 322. As shown, multiple concave reflecting surfaces may be employed to direct light to multiple detectors.

Figure 27:
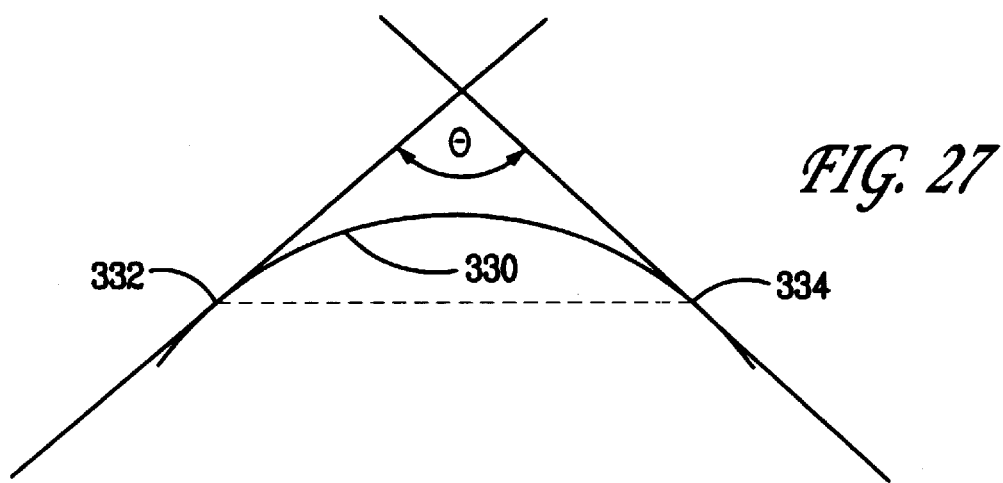
FIG. 27 provides a side view of the marker shown in FIG. 26.

FIG. 27 provides a side view of reflective surface 330 shown in FIG. 26. Angle θ represents the angle between tangents to reflective surface points 332 and 334 which provide two serial reflections prior to reflecting light to a detector. The present invention encompasses all angles of θ which provide for the detection of light at detector 322. Thus, the angle θ between tangent lines of any two points which might direct light at the detector are presumed to fall within the invention.

Fourth Embodiment

Another embodiment of the present invention employs light pipe technology to transmit light and generate reflection patterns in locations of the disk drive which distinguish the cartridge from foreign objects. In this embodiment, one or more optical light pipes are embodied in a storage cartridge such as a disk cartridge and operate to redirect illuminated light received from one light emitting source in a disk drive to one or more light detection devices located in the disk drive. The light is transmitted by the light pipes and directed toward the light detection device at a location sufficiently far from the light source and/or in a location of the disk drive so that there can be no confusing the light exiting the light pipe from that generated by foreign objects which generate diffuse and specular reflections. Thus, the inventive markers employing light pipes are an effective discriminator of foreign objects by providing paths for the distribution of light in positions and distributions where natural reflections off of foreign objects would not be as intense. Further, markers in accordance with the invention provide a reliable means for routing light to a detection means and thereby avoid geometric inconsistencies such as linkages in the drive which otherwise might interfere with transmission of the light.

Figure 28:
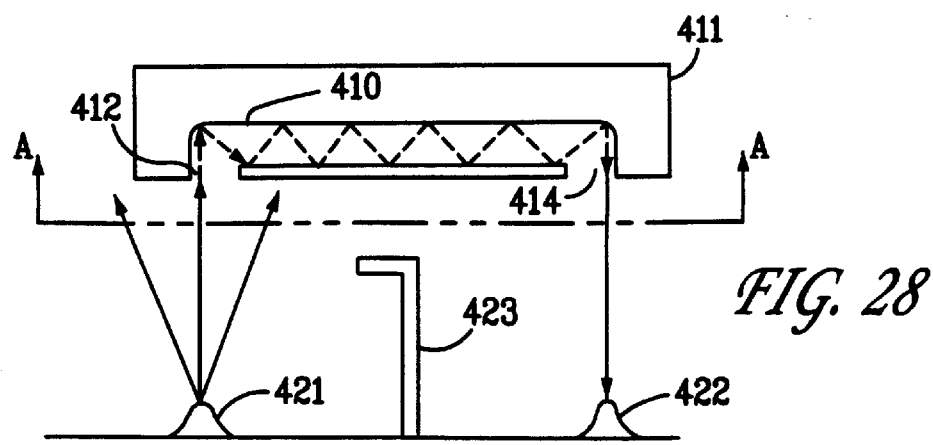
FIG. 28 provides side view of a marker incorporating an optical light pipe.

Referring to FIG. 28, there is presented a side view of the write protective marker area 411 embodying optical light pipe technology. As shown, optical transmitting pipe 410 is situated in protective marker 411. Optical transmitting pipe 410 has light collection aperture 412 and light exit aperture 414. Light which enters light collection aperture 412 is transmitted the length of the optical transmitting pipe 410 to light exit aperture 414. The length of optical transmitting pipe 410 comprises an optically transmissive material. The geometry and index of refraction of pipe 410 are such that the majority of light which enters pipe 410 is internally reflected by the walls of the pipe according to Snell's law of refraction. Various polymers and glasses are suitable optical pipes 410.

As shown, emitting diode 421 located in a disk drive emits light toward the disk cartridge in which protective marker 411 is situated. A portion of the light emitted from emitter 421 enters light collection aperture 412. The light is transmitted the length of pipe 410 as indicated by the dotted lines to light exit aperture 414. Light exits aperture 414 and is received by light detector 422 in the disk drive. In accordance with the description above, the light received at light detector 422 indicates to the disk drive that a valid cartridge and not a foreign object has been properly inserted into the drive.

FIG. 29 provides a view of marker 411 taken along line A—A of FIG. 28. As shown, marker 411 comprises three light pipes 410, 420, and 430. Each of pipe 410, 420, and 430 have a light collection aperture 412, 422, 432 and a light exit aperture 414, 424, and 434. Of course, more or less light pipes could alternatively be employed. Further, a single collection aperture with one or more exit apertures could alternatively be employed. In the pictured embodiment, light emitted from one or more light emitters located in a disk drive is received in collection apertures 412, 422, and 432. The light is transmitted the length of light pipes 410, 420, and 430 (shown in dashed lines) to light exit apertures 414, 424, and 434. The light leaving light exit apertures 414, 424, and 434 is detected by one or more light detection devices situated in the drive. In accordance with the description provided above, the drive uses this information to identify that a valid disk cartridge and not a foreign object has properly been inserted into the drive.

Fifth Embodiment

Another alternative embodiment of the present invention involves embodying a light emitting device such as an LED, incandescent light or electroluminescent material, etc. in a disk cartridge. According to this embodiment, the light provided by the embedded LED is sufficiently intense such that it can be distinguished from solely reflected light. In one variation of this embodiment, the intensity and angular spread of the light source is directionally oriented in a broad throw covering a multiplicity of drive embedded optical detector locations. In another variation, the cartridge light source is directionally orientate in such a manner to direct the light principally to one or more detector locations. Because the magnitude of the light emitted from the light source is larger than that typically provided by reflection from foreign objects, the illuminating tag or light source provides a means to identify haphazard reflections and thus distinguishes a properly inserted cartridge from foreign objects.

It should be noted that an LED may be combined with retroreflective materials or redirective reflective materials such as that described above. In such embodiments, the reflected light only, or that emitted from the LED may provide sufficient intensity to activate the detector and thus indicate that a valid cartridge and not a foreign object is properly situated in the drive. In such an embodiment, the LED light provides a light of an intensity level such that it is distinguishable from flat diffuse or flat specular reflectors.

FIG. 30 provides a diagram of a cartridge marker and drive configuration in accordance with this embodiment. As shown, LED 510 is situated in marker 511. LED 510 is electrically connected to power source 512 such as a battery. Optional electrical switch 514 provides the capability to selectively turn LED 510 on and off. The optional switch 514 may be activated by inserting the cartridge into the drive. The LED 510 may operate in cooperation with reflected light from light emitter 521. If the light received at light detector 522 is sufficiently intense, the drive identifies that a disk cartridge for operation with the drive and not a foreign object is situated in the drive. Of course, if the light received at detector 522 is not of sufficient intensity, the disk drive does not recognize the object as a valid disk and therefore operates as described above to protect the read/write hardware.

Any of the above described marker embodiments of the invention may be made rotatable relative to the data drive. By making the marker rotatable, varying photonic sensor locations and optical drive path configurations (e.g. light baffle and tilted photointerrupter configurations) can be accommodated. Thus, a reflective marker in accordance with those discussed above may align with an emitter and detector pair in one drive and thereafter the same disk cartridge and reflective marker may be aligned with a different emitter, detector pair configuration in a different drive type simply by rotating the reflective marking. Alternatively, two different marking types could be situated on a single rotatable marker so that different marker types can be employed depending on the type of emitter, detector pair that may be used in a particular drive. Thus, this embodiment allows for the possibility that a single cartridge may be compatible with multiple disk drive models.

Figure 31:
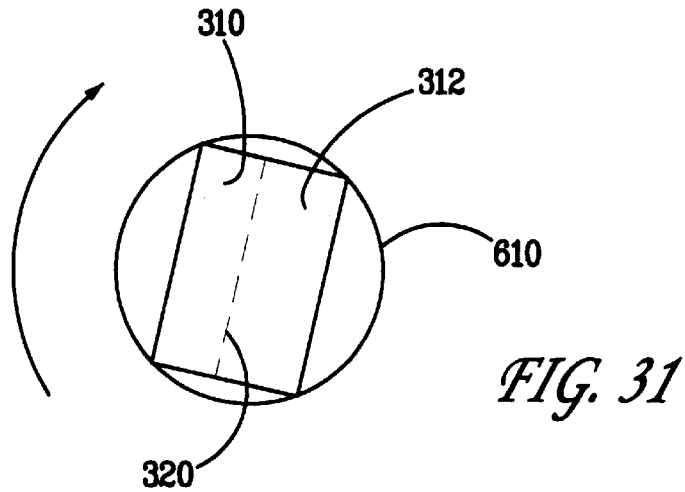
FIG. 31 provides a perspective top view of a rotatable marker.

FIG. 31 provides a perspective top view of rotatable marker 610 in accordance with the present invention. As shown, a reflective device such as that described above with reference to FIG. 23 has been mounted on circular marker 610. The marker is rotatable so that the reflective element can be appropriately aligned with and operated with varying emitter and detector configurations that may be encountered with different drive models.

Figure 32:
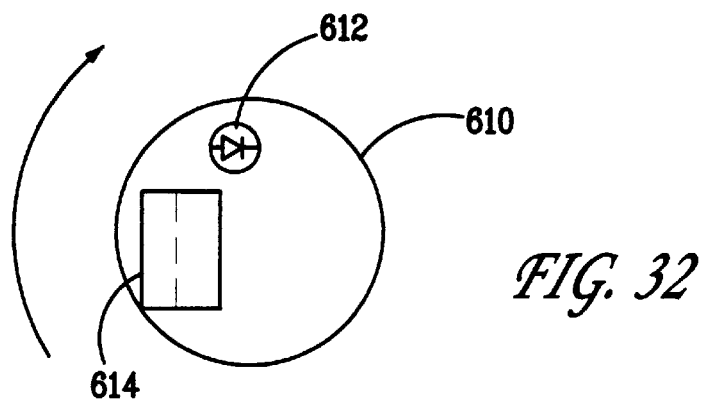
FIG. 32 provides a top view of a rotatable marker having an irradiance source thereon.

FIG. 32 provides a top view of rotatable marker 610 having light source 612 such as a light emitting diode (LED) as well as a reflective marker 614 mounted thereon. In such an embodiment, LED 612 can be rotated to align with a detector located at various locations in the drive. If the cartridge were employed in a disk drive designated to be operated exclusively with a reflective mirror marker, reflective marker 614 can be rotated into the appropriate location relative to the emitter/detector pair.

The present invention also encompasses removable markers. Removable markers provide the capability to insert and remove markers of different types into a data cartridge. Removable markers may be useful in many situations. For example, data drives may identify a compatible data cartridge by the marker located thereon. By providing the capability to change markers on a data cartridge so that it might be recognized in more than one drive type. Thus, removable markers provide for a single data cartridge being used in multiple data drives which otherwise would be incompatible if not for the ability to change markers in accordance with the present invention.

Figure 33:
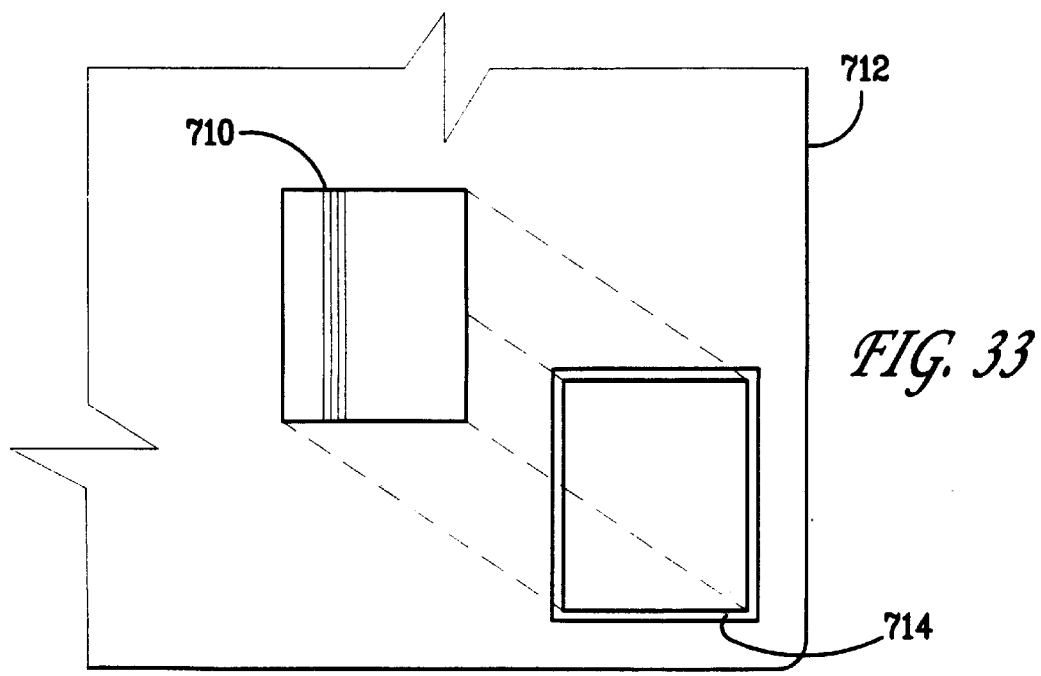
FIG. 33 provides a view of a removable marker.

FIG. 33 provides an enlarged, isolated view of a removable marker in accordance with the present invention. As shown, a marker 710 is shown inserted into a receptacle area 714 in cartridge 712. Marker 710 may be held in place on cartridge 712 by any of numerous methods. For example marker 710 may be held in place by an adhesive. Alternatively, marker 710 may be held in place using interference between a male/female lip arrangement between marker 710 and receptacle area 714. Marker 710 might also be secured to a disk cartridge via insertion into a slot arrangement in cartridge 712.

Numerous embodiments of a marker for detection of foreign objects have been set forth above. It is to be understood, however, that even in numerous characteristics and advantages of the present invention have been set forth in the foregoing description, together with details of the structure and function of the invention, the disclosure is illustrative only, and changes may be made to detail, especially in matters of shape, size and arrangement of parts within the principles of the invention to the full extent indicated by the broad general meaning of the terms in which the appended claims are expressed.

What is claimed is:

1. A disk cartridge for use in a data disk drive, comprising:
    a top planar surface, a bottom planar surface, and an irradiance emitting apparatus located on one of said top planar surface and said bottom planar surface, said irradiance emitting apparatus generating an irradiant impulse to signal the data disk drive when said disk cartridge is properly seated in the data disk drive .

2. The cartridge of claim 1, wherein said irradiance emitting apparatus is a light emitting diode.

3. The cartridge of claim 1, wherein said irradiance emitting apparatus comprises an incandescent light.

4. The cartridge of claim 1, wherein said irradiance emitting apparatus comprises an electroluminescent material.

5. The cartridge of claim 1, further comprising a retroreflective material affixed to the exterior of said cartridge.

6. The cartridge of claim 1, wherein said irradiance emitting apparatus comprises a light source and a power source electrically connected to said light source for providing electrical energy to said light source.

7. The cartridge of claim 6, wherein said irradiance emitting apparatus further comprises an electrical switch electrically connected to said power source and said light source and operable to selectively control electricity to said light source.

8. The cartridge of claim 7, wherein said electrical switch is activated upon insertion of said cartridge into the data drive.

9. The cartridge of claim 1, wherein said irradiance emitting apparatus is rotatable relative to the data drive.

* * * * *

UNITED STATES PATENT AND TRADEMARK OFFICE
CERTIFICATE OF CORRECTION

PATENT NO. : 6,067,214
DATED : May 23, 2000
INVENTOR(S) : Fred Thomas, III

It is certified that error appears in the above-identified patent and that said Letters Patent is hereby corrected as shown below:

In the Abstract, line 3, delete "In one embodiment down to line 9" and ending with "for reflective light.";

In the Abstract, line 14, delete "These embodiments" and insert --This embodiment--.

Signed and Sealed this

Third Day of April, 2001

Attest:

NICHOLAS P. GODICI

Attesting Officer

Acting Director of the United States Patent and Trademark Office